United States Patent
Vamshi et al.

(10) Patent No.: US 12,306,863 B2
(45) Date of Patent: May 20, 2025

(54) METHOD AND SYSTEM OF EXTRACTING DATA BASED ON SPATIAL FEATURES

(71) Applicant: L&T TECHNOLOGY SERVICES LIMITED, Chennai (IN)

(72) Inventors: Kalakonda Krishna Vamshi, Hyderabad (IN); Rajesh Raj, Bengaluru (IN); Madhusudan Singh, Bangalore (IN); Niveditha Sureshbabu, Bengaluru (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 18/430,709

(22) Filed: Feb. 2, 2024

(65) Prior Publication Data
US 2025/0103637 A1     Mar. 27, 2025

(30) Foreign Application Priority Data

Sep. 22, 2023 (IN) .............................. 202341063875

(51) Int. Cl.
*G06F 16/35*     (2025.01)
*G06F 16/3332*   (2025.01)

(52) U.S. Cl.
CPC .......... *G06F 16/35* (2019.01); *G06F 16/3334* (2019.01)

(58) Field of Classification Search
CPC .......................... G06F 16/35; G06F 16/3334
See application file for complete search history.

(56) References Cited

U.S. PATENT DOCUMENTS

| 11,176,364 B2 | 11/2021 | Meier et al. | |
| 2018/0121392 A1* | 5/2018 | Zhang | G06F 40/169 |
| 2021/0390458 A1 | 12/2021 | Blumstein et al. | |
| 2024/0177068 A1* | 5/2024 | Fusting | G06N 20/00 |

FOREIGN PATENT DOCUMENTS

IN          201821015669 A     11/2019

\* cited by examiner

*Primary Examiner* — Cam Y T Truong
(74) *Attorney, Agent, or Firm* — Kendal M. Sheets

(57) ABSTRACT

A method and system of extracting data from a set of documents is disclosed. A processor determines a plurality of spatial features for each of the set of documents based on a set of keywords and a set of entities extracted from the documents. A variance is determined between at least one of the plurality of spatial features determined for each of the documents. Layout is determined based on the spatial features and variance. Each set of documents is clustered in at least one cluster based on a similarity between the layouts of the documents using a first machine learning model. Spatial features are selected using a second machine learning model. Data of the set of entities is extracted corresponding to the keywords in the documents based on the selection of the features and the similarity between the layouts using a third machine learning model.

18 Claims, 10 Drawing Sheets

| PO Number 302 | PO Value 304 | PO Date 306 | Bill To 308 | Ship To 310 | bill_from 312 | Currency 314 | po_to_date 316 | po_from_date 318 |
|---|---|---|---|---|---|---|---|---|
| SERVICE ORDER AMENDMENT | Amount | Approved Date | Billing address | Delivery address | Header less | Currency | Delivery date | Order date |
| Purchase Order Number | Amount To | Bestelldatum | Send Invoice To | Please deliver to: | Vendor information | Currency | Deliv. date | |
| Statement of Work ID | Grand Total | Creation Date | Company Address | Ship To | Supplier | Currency | Validity End date | Time Sheet Start Date |
| Purchase Order no | Gross Amount | Date | Header less | Ship All Items To | Supplier Account | Currency | Need by Date | Header less |
| | | | | | | | | Validity Start date |

FIG. 3

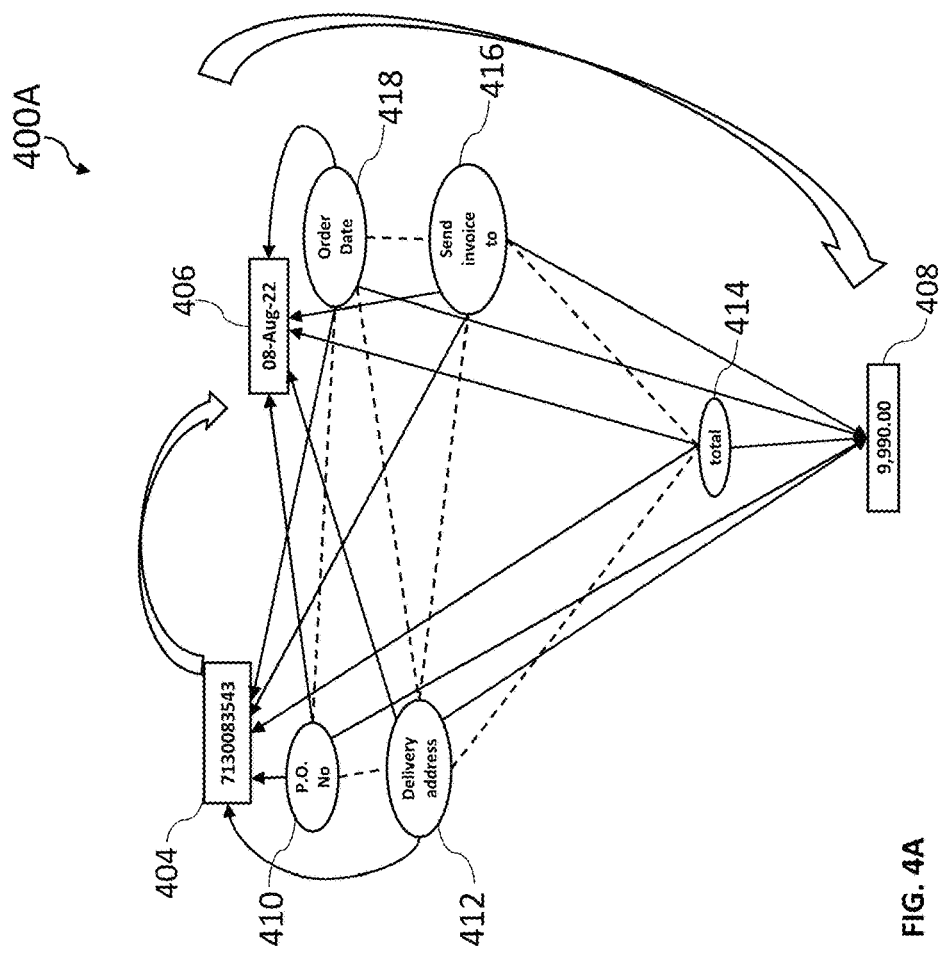
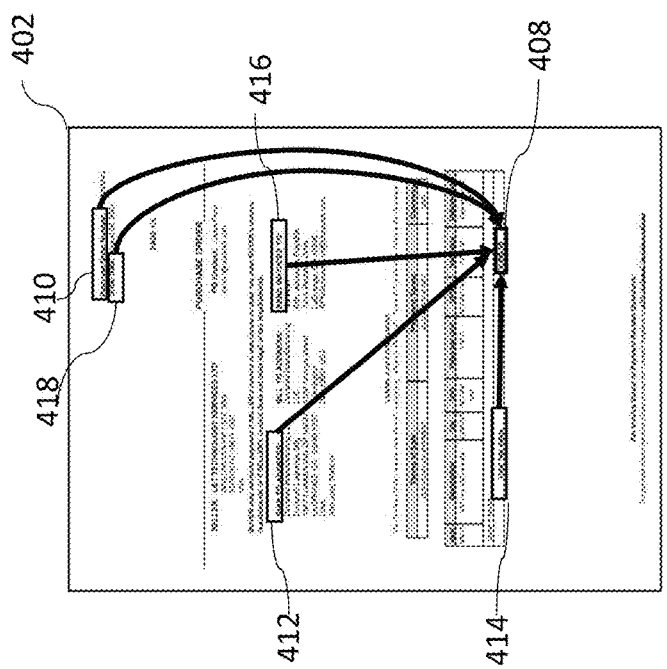
FIG. 4A

| Document file name 420 | Entity 422 | PO num distance 424 | PO Date distance 426 | Ship to distance 428 | Bill to distance 430 | PO value distance 432 | page No 434 | Sequence No 436 |
|---|---|---|---|---|---|---|---|---|
| 402 | 7130083543 | 0.9996 | 0.9980 | 0.3067 | 0.1163 | 0.4102 | 1 | 1 |
| | 08-Aug-22 | 0.9999 | 0.9998 | 0.2613 | 0.2008 | 0.3786 | 1 | 2 |
| | 9,990.00 | 0.6571 | 0.6705 | 0.2599 | 0.9974 | 0.1752 | 1 | 3 |

FIG. 4B

| Document file name 520 | Entity 522 | PO num distance 524 | PO Date distance 526 | Ship to distance 528 | Bill to distance 530 | PO value distance 532 | page No 534 |
|---|---|---|---|---|---|---|---|
| 502 | 7130083801 | 0.9996 | 0.9980 | 0.3067 | 0.1163 | 0.5747 | 1 |
| | 15-Aug-22 | 0.9999 | 0.9998 | 0.2613 | 0.2008 | 0.5542 | 1 |
| | 14,918.00 | 0.3786 | 0.3885 | 0.4899 | 0.8231 | 0.1336 | 2 |

FIG. 5B

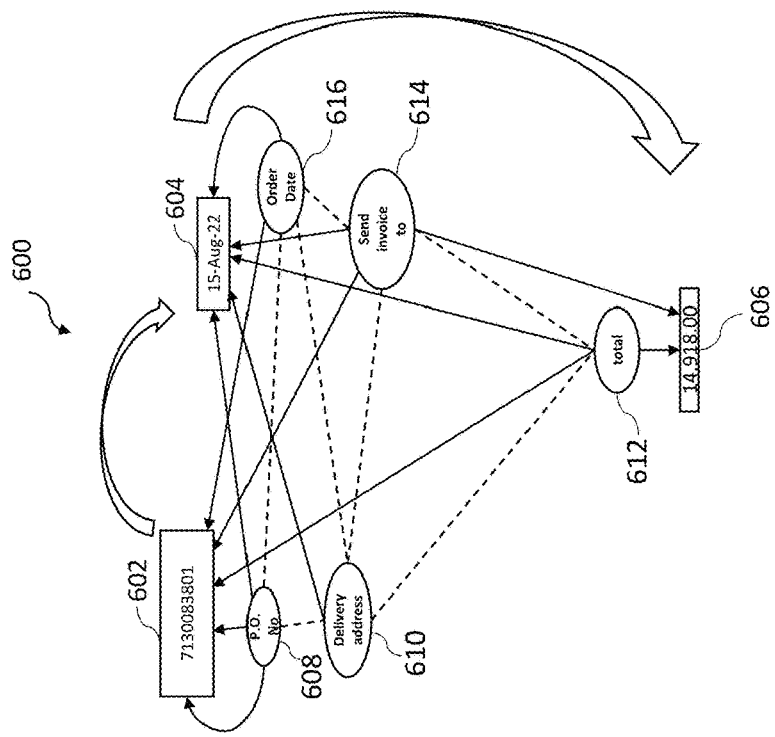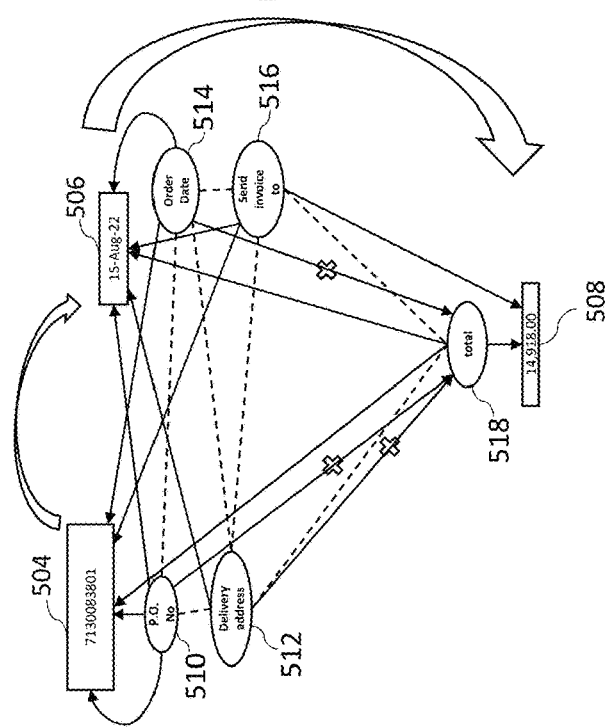
FIG. 6

METHOD AND SYSTEM OF EXTRACTING DATA BASED ON SPATIAL FEATURES

TECHNICAL FIELD

This disclosure relates generally to data extraction, and more particularly to a method and a system of extracting data based on spatial features.

BACKGROUND

Multiple documents are exchanged by organizations related to various purposes such as purchase orders, invoices, etc. Such documents are required to be managed and documented digitally. Manual management of such documents in large numbers is a cumbersome task. Further, there is a need to segregate documents belonging to various vendors in order to settle accounts by the accounting system. Such segregation of documents may be performed based on data extraction. However, extracting data of semi-structured documents becomes onerous and erroneous when done manually. Further, complexity of meta data extraction is high since data location heavily depends on layout structure of such semi-structured documents. Further, accuracy of data extraction is required in order to avoid financial losses and errors in the case of financial documents.

Some available rule-based techniques may be used to segregate documents. However, such techniques are not versatile as rules for each type of document are required to be predefined. Therefore, such techniques are not scalable and have slow processing time.

Therefore, there is a requirement for an efficient methodology to extract data from documents in an accurate manner.

SUMMARY OF THE INVENTION

In an embodiment, a method of extracting data from a set of documents is disclosed. The method may include, determining, by a processor, a plurality of spatial features for each of the set of documents based on a set of keywords and a set of entities extracted from each of the set of documents. In an embodiment, the plurality of spatial features may include a plurality of text features, a plurality of layout features, and a plurality of location features. The method may further include determining a variance between at least one of the plurality of spatial features determined for each of the set of documents. The method may further include determining a layout for each of the set of documents based on the plurality of spatial features and the variance. The method may further include clustering each of the set of documents in at least one of a plurality of predefined clusters based on a similarity between the layouts of the set of documents using a first machine learning model. In an embodiment each of the plurality of predefined clusters may correspond to a unique document layout from a plurality of document layouts. In an embodiment, the first machine learning model may be trained based on first training data. In order to train the first machine learning model, first training data may include a plurality of documents corresponding to the plurality of document layouts. In an embodiment, the similarity between the layouts of at least two of the set of documents may be determined by selecting one or more spatial connections between the set of keywords and an entity in each of the at least two documents based on the variance. The method may further include selecting one or more features from the plurality of spatial features using a second machine learning model. In an embodiment, the second machine learning model may be trained to select the one or more from the plurality of spatial features based on a probability of accuracy of each of the plurality of spatial features based on second training data. The method may further include extracting in each of the set of documents, data of the set of entities corresponding to the set of keywords based on the selection of the one or more features and the similarity between the layouts of at least two of the set of documents using a third machine learning model. In an embodiment, the third machine learning model may be trained to determine a feature-based probability for the extraction of the data of the set of entities corresponding to the set of keywords based on third training data.

In another embodiment, a system of extracting data from a set of documents is disclosed. The system may include a processor, a memory communicatively coupled to the processor, wherein the memory may store processor-executable instructions, which when executed by the processor may cause the processor to determine a plurality of spatial features for each of the set of documents based on a set of keywords and a set of entities extracted from each of the set of documents. In an embodiment, the plurality of spatial features may include a plurality of text features, a plurality of layout features, and a plurality of location features. The processor may further determine a variance between at least one of the plurality of spatial features determined for each of the set of documents. The processor may further determine a layout for each of the set of documents based on the plurality of spatial features and the variance. The processor may further cluster each of the set of documents in at least one of a plurality of predefined clusters based on a similarity between the layouts of the set of documents using a first machine learning model. In an embodiment each of the plurality of predefined clusters may correspond to a unique document layout from a plurality of document layouts. In an embodiment, the first machine learning model may be trained based on first training data. In order to train the first machine learning model, first training data may include a plurality of documents corresponding to the plurality of document layouts. In an embodiment, the similarity between the layouts of at least two of the set of documents may be determined by selecting one or more spatial connections between the set of keywords and an entity in each of the at least two documents based on the variance. The processor may further select one or more features from the plurality of spatial features using a second machine learning model. In an embodiment, the second machine learning model may be trained to select the one or more from the plurality of spatial features based on a probability of accuracy of each of the plurality of spatial features based on second training data. The processor may further extract in each of the set of documents, data of the set of entities corresponding to the set of keywords based on the selection of the one or more features and the similarity between the layouts of at least two of the set of documents using a third machine learning model. In an embodiment, the third machine learning model may be trained to determine a feature-based probability for the extraction of the data of the set of entities corresponding to the set of keywords based on third training data.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 depicts an exemplary keyword lookup table, in accordance with an embodiment of the present disclosure.

FIG. 4A depicts exemplary spatial connections for an exemplary first document image, in accordance with an embodiment of the present disclosure.

FIG. 4B depicts a table providing location features for the first document image, in accordance with some embodiment of the present disclosure.

FIG. 5B depicts a table with location features determined for the second document image, in accordance with some embodiment of the present disclosure.

FIG. 6 depicts an exemplary layout determined based on optimization of spatial layout of FIG. 5B, in accordance with an embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

Since documents may include data in various formats, extraction of such data becomes a complex task. The present disclosure provides a methodology for extracting data based on spatial features.

Figure 1:
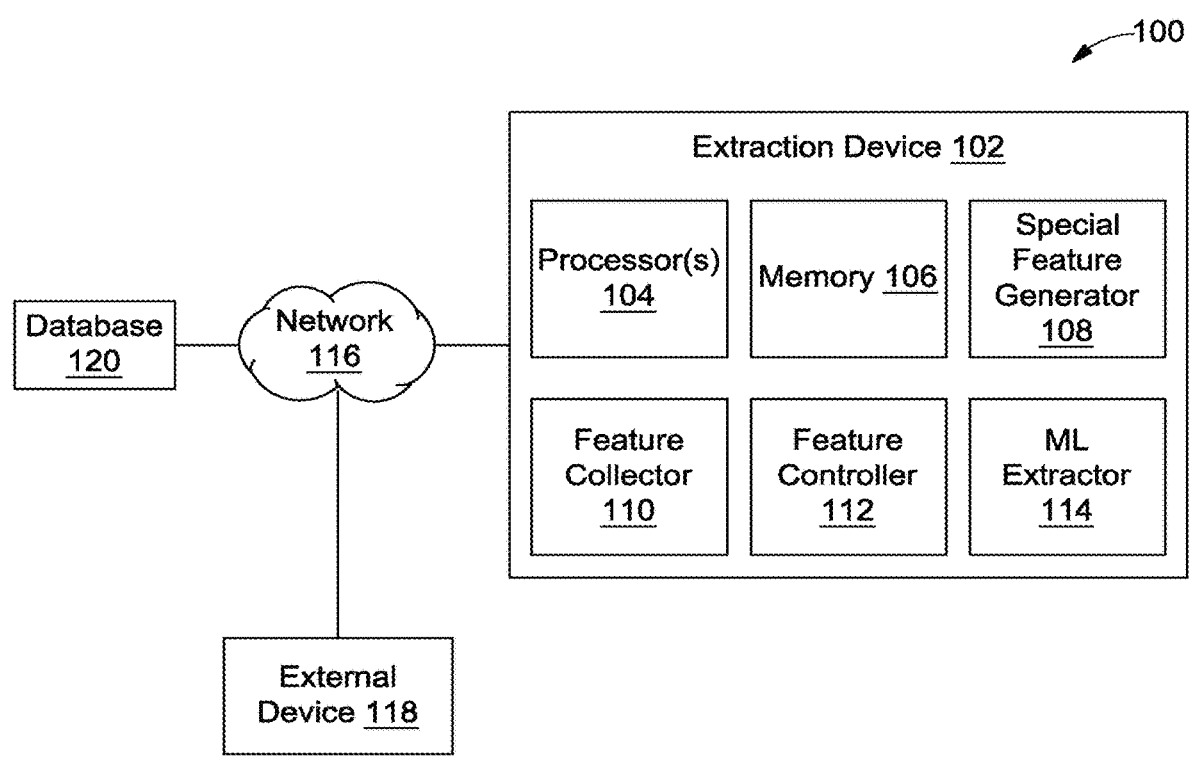
FIG. 1 illustrates a block diagram of an exemplary data extraction system for extracting data based on spatial features, in accordance with some embodiments of the present disclosure.

Referring now to FIG. 1, a block diagram of an exemplary data extraction system 100 for extracting data based on spatial feature, in accordance with some embodiments of the present disclosure is illustrated. The data extraction system 100 may include an extraction device 102, an external device 118, and a database 120 communicably coupled to each other through a wired or a wireless communication network 116. The extraction device 102 may include a processor 104 and a memory 106. In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors. In an embodiment, the memory 106 may store instructions that, when executed by the processor 104, and cause the processor 104 to extract data from a set of documents, as discussed in greater detail below. In an embodiment, the memory 106 may be a non-volatile memory or a volatile memory. Examples of non-volatile memory may include but are not limited to, a flash memory, a Read Only Memory (ROM), a Programmable ROM (PROM), Erasable PROM (EPROM), and Electrically EPROM (EEPROM) memory. Further, examples of volatile memory may include but are not limited to, Dynamic Random Access Memory (DRAM), and Static Random-Access memory (SRAM).

In an embodiment, the extraction device 102 may include a spatial feature generator 108, a feature collector 110, a feature controller 112, and an ML extractor 114. The database 120 may be enabled in a cloud or a physical database and may include a set of documents and training data. In an embodiment, the database 120 may store data input by an external device 118 or output generated by the extraction device 102. In an embodiment, the set of documents may include, but not limited to, images of documents which may be digitally scanned or created as digital PDF documents.

In an embodiment, the communication network 116 may be a wired or a wireless network or a combination thereof. The network 116 can be implemented as one of the different types of networks, such as but not limited to, ethernet IP network, intranet, local area network (LAN), wide area network (WAN), the internet, Wi-Fi, LTE network, CDMA network, 5G and the like. Further, network 116 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further network 116 can include a variety of network devices, including routers, bridges, servers, computing devices, storage devices, and the like.

In an embodiment, the extraction device 102 may receive a request for extracting data from the set of documents from the external device 118 through the network 116. In an embodiment, the extraction device 102 and the external device 118 may be a computing system, including but not limited to, a smart phone, a laptop computer, a desktop computer, a notebook, a workstation, a portable computer, a personal digital assistant, a handheld, a scanner, or a mobile device. In an embodiment, the extraction device 102 may be, but not limited to, in-built into the external device 118 or may be a standalone computing device.

In an embodiment, the processor 104 may enable the spatial feature generator 108, the feature collector 110, the feature controller 112, and the ML extractor 114 in order for them to perform various processing for extracting data from the set of documents. By way of an example, the spatial feature generator 108 may determine line-text data for each of a plurality of lines of each of the set of documents using a text extraction technique. The spatial feature generator 108 may further determine a set of keywords and a set of entities in the each of the set of documents based on a predefined list of keywords. In an embodiment, the set of keywords in the line-text data may be determined based on a keyword lookup table. In an embodiment, the keyword lookup table may include a predefined list of keywords and at least one alias corresponding to each of the predefined list of keywords. In an embodiment, the determination of the set of keywords may be based on a methodology described in previously filed patent application titled "METHOD AND SYSTEM OF CLASSIFYING DOCUMENTS BASED ON LAYOUT DETERMINATION", having patent application number "IN202341039663" incorporated herein in its entirety by reference. In an embodiment, the set of entities in each of the set of documents may be determined based on detection of one or more of numeric characters and/or a combination of numeric characters, a combination of alphabetic characters and/or alphanumeric characters other than the set of keywords. SEMANTIC Further, the spatial feature generator 108 may determine an entity for each of the set of keywords based on a third machine learning model that may be trained to determine an entity corresponding to each of the set of keywords based on a third training data. In an embodiment, the third training data may include historical document data having a set of keywords each having their corresponding set of entities, and one or more types of spatial features extracted from each of the historical document data. In an embodiment, the third machine learning model may determine a plurality of prospective entities corresponding to a keyword from the set of keywords based on a probability determination of the plurality of prospective entities corresponding the corresponding keywords based on the third training data. In an exemplary embodiment, the third machine learning model may select an entity from the plurality of prospective entities corresponding to the keyword having a highest probability based on the plurality of spatial features.

Further, the spatial feature generator 108 may further determine one or more spatial connections between each of the set of keywords and each of the set of entities in a sequential manner. The spatial feature generator 108 may further determine a plurality of spatial features based on a set of keywords and a set of entities extracted from each of the set of documents, the plurality of spatial features may include a plurality of text features, a plurality of layout features, and a plurality of location features. In an embodiment, the plurality of text features may further include numeric features, percentage features, positioning features, pattern features, etc. The plurality of text features may correspond to the set of entities and may be determined based on a methodology described in previously filed patent application titled "METHOD AND SYSTEM OF EXTRACTING NON-SEMANTIC ENTITIES", having patent application number "IN202341030420" incorporated herein in its entirety by reference.

Accordingly, the plurality of location features may include co-ordinate location information and angle information of each of the keywords and entities corresponding to each other, etc. In an embodiment, the plurality of location information may be determined based on a methodology described in previously filed patent application titled "METHOD AND SYSTEM OF CLASSIFYING DOCUMENTS BASED ON LAYOUT DETERMINATION", having patent application number "IN202341039663" and/or "METHOD AND SYSTEM OF EXTRACTING NON-SEMANTIC ENTITIES", application number "IN202341030420" incorporated herein in its entirety by reference. Further, the plurality of layout features includes determination of a layout of a document based on determination of keyword to keyword connections as described in detail in previously filed patent application titled "METHOD AND SYSTEM OF CLASSIFYING DOCUMENTS BASED ON LAYOUT DETERMINATION", having patent application number "IN202341039663" incorporated herein in its entirety by reference. Further, the plurality of spatial features may include a spatial information for each of the set of entities and each of the set of keywords of each of the set of documents. In an embodiment, the spatial information may include a coordinate distance between the each of the set of entities and each of the set of keywords of each of the set of documents.

The spatial feature generator 108 may further determine a variance between at least one of the plurality of spatial features determined for each of the set of documents. The spatial feature generator 108 may further select a predefined number of the one or more spatial connections in the at least two documents in case the variance between the spatial information between the set of keywords and the entity in each of the at least two documents may be determined as greater than a predefined variance threshold. The spatial feature generator 108 may further determine a layout based on the plurality of spatial features and the variance. In an embodiment, the spatial feature generator 108 may determine layouts of each of the set of documents based on the plurality of layout features.

Further, the feature collector 110 may cluster each of the set of documents in at least one of a plurality of predefined clusters based on a similarity between the layouts of the set of documents using a first machine learning model. In an embodiment, examples of the first machine learning clustering model may include, but not limited to, k-means, DB-scan, Hierarchical clustering etc. Further, the each of the plurality of predefined clusters may correspond to a unique document layout from a plurality of document layouts. Further, the first machine learning model may be trained based on a first training data that may include a plurality of documents corresponding to the plurality of document layouts. In an embodiment, the set of documents may be clustered based on determination of their layouts based on the plurality of layout features. Further, the similarity between the layouts of at least two of the set of documents may be determined by selecting one or more spatial connections between the set of keywords and an entity in each of the at least two documents based on the variance.

Further, the feature controller 112 may select one or more features from the plurality of spatial features using a second machine learning model. In an embodiment, the second machine learning model may be trained to select the one or more features from the plurality of spatial features based on a probability of accuracy of each of the plurality of spatial features based on second training data.

Further, the ML extractor 114 may extract in each of the set of documents, data of the set of entities corresponding to the set of keywords based on the selection of the one or more features and the similarity between the layouts of at least two of the set of documents using a third machine learning model. In an embodiment, the third machine learning model may be trained to determine a feature-based probability for the extraction of the data of the set of entities corresponding to the set of keywords based on a third training data.

Figure 2:
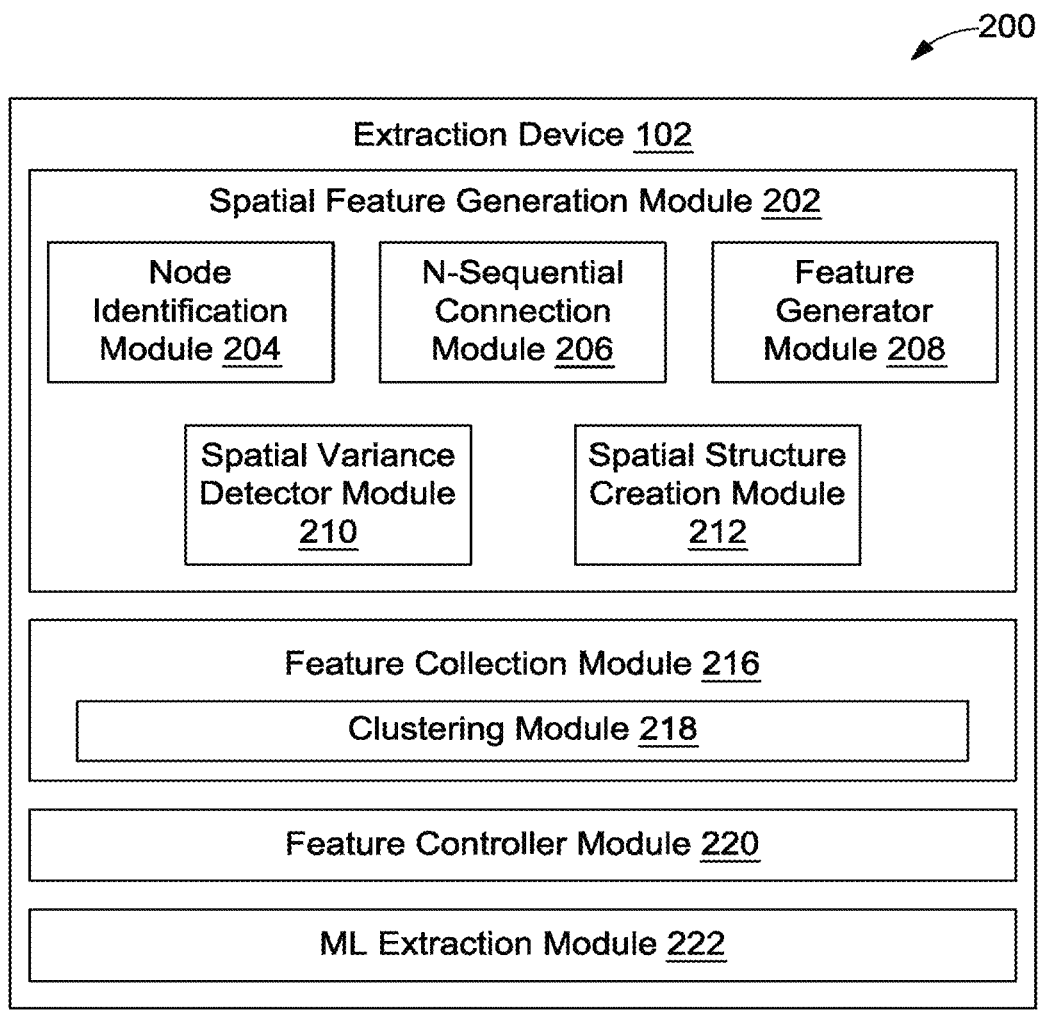
FIG. 2 is a functional block diagram of the extraction device, in accordance with some embodiments of the present disclosure.

Referring now to FIG. 2, a functional block diagram of the extraction device 102 is illustrated, in accordance with some embodiments of the present disclosure. In an embodiment, the extraction device 102 may include a spatial feature generation module 202, a feature collection module 216, a feature controller module 220, a ML extractor module 222.

The spatial feature generation module 202 may be implemented in the spatial feature generator 108 and may determine the line-text data for each of the plurality of lines of the document using a text extraction technique. In an embodiment, the text extraction technique may include, but not limited to, Optical Character Recognition (OCR) technique, etc. Further, the spatial feature generation module 202 may further sub-include a node identification module 204, an N-sequential connection module 206, a feature generator module 208, a spatial variance detector module 210, and a spatial structure creation module 212. The node identification module 204 may determine line-text data for each of plurality of lines of each of the set of documents using a text extraction technique. The node identification module 204 may determine a set of keywords in each of the documents based on a predefined list of keywords. The set of keywords in the line-text data may be determined based on a keyword lookup table. In an embodiment, the keyword lookup table may include a predefined list of keywords and at least one alias corresponding to each of the predefined list of keywords. Referring now to FIG. 3, a table 300 depicts an exemplary keyword lookup table, in accordance with an embodiment of the present disclosure. Table 300 provides a predefined list of aliases for each of the keywords such as "PO Number", "PO Value", "PO Date", "Bill to", "Ship To", "bill_from", "Currency", "po_to_date", and "po_from_date", etc. in columns 302, 304, 306, 308, 310, 312, 314, 316, and 318. In an exemplary embodiment, in case a document includes an alias corresponding to a keyword, the particular alias is determined as a key-node in the document.

In an embodiment, each document may include one or more numbers of keywords. In an embodiment, documents which may include the same keywords, may be segregated as documents belonging to a particular type. In an exemplary embodiment, in case four out of a set of documents include four same keywords belonging to document type "invoice", the four documents may be segregated as invoice document type. Further, the extraction of the data from such documents may be performed based on the further processing as described further in detail.

In an embodiment, the set of entities in each of the set of documents may be determined based on detection of one or more of numeric characters and/or a combination of numeric characters, one or more alphabetic characters and/or alphanumeric characters other than the set of keywords identified by the node identification module 204. In an embodiment, an entity for each of the set of keywords may be determined based on a third machine learning model that may be trained to determine an entity corresponding to each of the set of keywords based on a third training data. In an embodiment, the third training data may include historical document data having a set of keywords each having their corresponding set of entities, and one or more types of spatial features extracted from each of the historical document data. In an embodiment, the third machine learning model may determine a plurality of prospective entities corresponding to a keyword from the set of keywords based on a probability determination of each of the plurality of prospective entities corresponding the corresponding keywords based on the third training data. In an exemplary embodiment, the third machine learning model may select an entity from the plurality of prospective entities corresponding to the keyword having a highest probability based on the plurality of spatial features.

In an embodiment, a keyword-based layout of each of the set of documents may be determined based on determination of keyword to keyword connections and based on the plurality of layout features. In an embodiment, each of the set of documents may be clustered based on their corresponding keyword-based layout as described in detail in in previously filed patent application titled "METHOD AND SYSTEM OF CLASSIFYING DOCUMENTS BASED ON LAYOUT DETERMINATION", having patent application number "IN202341039663" incorporated herein in its entirety by reference. However, such clustering of the set of documents may not always be accurate in case of minimal variation in the keyword-based layouts of at least two documents from the set of documents as illustrated in detail below in FIG. 4A and FIG. 5A. Accordingly, the present disclosure provides a methodology of accurately clustering of the set of documents based on spatial connections between each of the set of keywords and each of the set of entities in the documents.

The N-sequential connection module 206 may determine one or more spatial connections between each of the set of keywords and each of the set of entities in a sequential manner. Referring now to FIG. 4A, exemplary spatial connections are depicted for an exemplary first document image 402, in accordance with an embodiment of the present disclosure. The first input document image 402 is depicted to includes a plurality of keywords 410, 412, 414, 416 and 418 and a plurality of entities 404, 406, 408. The first document image 402 depicts one set of spatial connections between the keywords 410, 412, 414, 416 and 418 and the entity 408. Similarly, the N-sequential connection module 206 may generate spatial connection layout 400A based on spatial connections between each of the plurality of keywords 410, 412, 414, 416 and 418 and each of the plurality of entities 404, 406, 408 in the first document image 402. FIG. 4A depicts a spatial connection layout 400A depicting spatial connections between each of the plurality of keywords 410, 412, 414, 416 and 418 and the entities 404, 406 and 408 determined in the first document image 402.

Referring back to FIG. 2, the feature generator module 208 may determine a plurality of spatial features based on the set of keywords and the set of entities determined in each of the set of documents. The plurality of spatial features comprises a plurality of text features, a plurality of layout features, and a plurality of location features. Referring now to FIG. 4B, a table 400B providing location features for the first document image 402 is depicted, in accordance with an embodiment of the present disclosure. The table 400B provides spatial distances between each of the keywords determined in the first document image 402 with some of the entities 422 in the first document image 402. Each of the plurality of columns 424, 426, 428, 430, 432, 434, and 436 provide a spatial distance information as one of the plurality of spatial features for each of the set of entities 404, 406, 408 in the first document image 402 as shown in FIG. 4A. The columns 424, 426, 428, 430, 432, 434, and 436 provide spatial distance between each of the set of keywords 410, 412, 414, 416, 418 and each of the set of entities 404, 406, 408. In an embodiment, the spatial distance may be a coordinate distance between a central coordinate position of each of the of the set entities 522 and the set of keywords of the first document image 402.

Figure 5A:
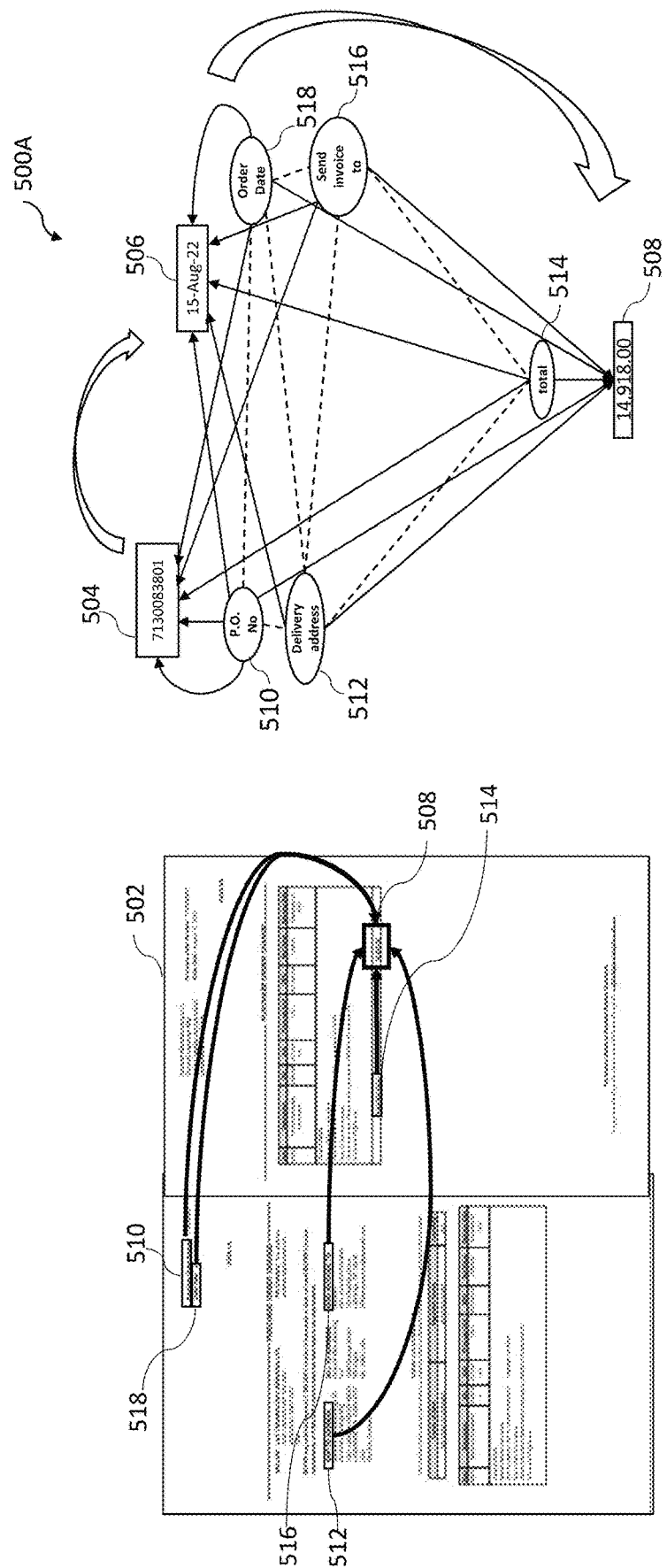
FIG. 5A depicts exemplary spatial connections for an exemplary second document image, in accordance with an embodiment of the present disclosure.

Referring now to FIG. 5A, exemplary spatial connections are depicted for an exemplary second document image 502, in accordance with an embodiment of the present disclosure. The second document image 502 is depicted to include a plurality of keywords 510, 512, 514, 516, 518 and a plurality of entities 504, 506, 508. The first document image 502 depicts one set of spatial connections between each of the keywords 510, 512, 514, 516, 518 and the entity 408.

Similarly, the N-sequential connection module 206 may generate spatial connection layout 500A based on spatial connections between each of the plurality of keywords 510, 512, 514, 516, 518 and each of the plurality of entities 504, 506, 508 in the second document image 502. Spatial connection layout 500A depicts spatial connections between each of the plurality of keywords 510, 512, 514, 516, 518 and each of the plurality of entities 504, 506, 508 in the second document image 502.

Further, FIG. 5B shows a table 500B with location features determined for the second document image 502, in accordance with an embodiment of the present disclosure. The table 500B provides spatial distances between each of the set of keywords and the entities 522 in the second document image 502. As shown in FIG. 5A, the second document image 502 includes the following keywords: "PO NO." 510, "Delivery Address" 512, "Total" 514, "Send Invoice to" 516, "Order date" 518 and the set of entities 504, 506, 508. The table 500B may include a plurality of columns 524, 526, 528, 530, 532, and 534 providing spatial distance between each of the set of entities 504, 506, 508 listed in column 522 for the document file name 520. In an embodiment, the spatial distance may be a coordinate distance between a central coordinate position of each of the of the set entities 522 and the set of keywords of the second document image 502.

Referring back to FIG. 2, the spatial variance detector module 210 may determine a variance between at least one of the plurality of spatial features determined for each of the set of documents. Further, the spatial structure creation module 212 may determine a layout based on the plurality of spatial features and the variance. The spatial structure creation module 212 may select a predefined number of the one or more spatial connections in the at least two documents in case the variance between the spatial information between the set of keywords and the entity in each of the at least two documents may be greater than a predefined variance threshold. The variance between at least one of the plurality of features may be determined based on the spatial information of the corresponding set of entities and the set of keywords. In an embodiment, as disclosed in table 400B and table 500B, the variance between the spatial information of the entity 408 to the corresponding keywords and the spatial information of the entity 508 to the corresponding keywords is determined greater than the variance threshold.

Accordingly, spatial variance detector module 210 may determine the variance in spatial distance given in Table 400B and Table 500B for the first document image 402 and the second document image 502. Since, the first document image 402 and the second document image 502 have similar set of keywords and similar keyword-based layout. However, due to position of the entity 508 of second document image 502 in a second page of the document the spatial layout 500A may vary from the spatial layout 400A due to difference in spatial connections. Therefore, the spatial variance detector module 210 may determine a variance between the spatial distances between the keywords and the entities in the two documents 402 and 502. As shown in Table 400B and Table 500B a variance in spatial distance is determined to be above variance level for the third row entity as highlighted.

Referring back to FIG. 2, the spatial structure creation module 212 may determine a spatial layout based on the plurality of spatial features. Further, the spatial structure creation module 212 may determine an optimized spatial layout based on the plurality of spatial features and the variance. In an embodiment, the spatial structure creation module 212 may optimize the spatial layout determined based on the spatial connections between each of the set of keywords and each of the entities in each of the documents. It is to be noted, that the spatial layout may be optimized based on the variance of at least one of the spatial feature such as, but not limited to, spatial distance between an entity and each of the keywords in at least two documents. In an embodiment, the spatial structure creation module 212 may determine a layout by optimizing of spatial layout by selecting one or more spatial connections between the set of keywords and the corresponding entity in each of the at least two documents based on the variance. In an embodiment, the optimized spatial layout may be determined by selecting one or more connection between the corresponding entity and one or more keywords having the least spatial distance between them. In an embodiment, a number of connections that may be selected is determined based on a variance level in at least one spatial feature. In an exemplary embodiment, in case a difference between a variance level and a variance threshold level is determined. In case the difference is greater than 70% of the variance threshold level, then only one closest connection between the corresponding entity and a keyword is selected. Further, in case the difference is less than 70% and greater than 40% then half of the closest connections between the corresponding entity and the keywords are selected. Further, in case the difference is less than 40% and greater than 10% then 30% of the closest connections between the corresponding entity and the keywords are selected. In case, the difference is less than 10% then all the spatial connections between the corresponding entity and a keyword are selected.

Referring now to FIG. 6, an optimized spatial layout 600 is shown determined based on optimization of the spatial layout 500A of FIG. 5A, in accordance with an embodiment of the present disclosure. The spatial layout 500A may be optimized based on selection of one or more spatial connections corresponding to the entity 508. As shown, in FIG. 6, the spatial structure creation module 212 may select two out of 5 spatial connections from the entity 508 to the keywords 510, 512, 514, 516, 518. In an embodiment, the closest connections i.e., connections having least spatial distance between the keyword and the entity may be selected i.e., connections to keywords 516 and 518 are selected by the spatial structure creation module 212.

Accordingly, the spatial structure creation module 212 may determine the optimized layout 600 based on the selection of the spatial connections based on the variance.

Referring back to FIG. 2, the feature collection module 216 may be implemented in the feature collector 110. The feature collection module 216 may sub-include a clustering module 218. The clustering module 218 may cluster each of the set of documents in at least one of a plurality of predefined clusters based on the keyword-based layouts of the set of documents. Further, the clustering module 218 may determine a similarity between a spatial layout and an optimized spatial layout using a first machine learning model. In an embodiment, each of the plurality of predefined clusters correspond to a unique document layout form a plurality of document layouts. In an embodiment, each of the plurality of layouts may depict a type of document such as, invoices, payment orders, memos, etc. The first machine learning model may be trained based on a first training data that may include a plurality of documents corresponding to each of the plurality of document layouts. The similarity between the layouts of at least two of the set of documents may be determined based on the optimized layout determined by the spatial structure creation module 212. In an embodiment, the first machine learning model may be selected as, but not limited to, clustering models such as, k-means, DB-scan, hierarchical clustering, etc.

Referring back to FIG. 2, the feature controller module 220 may be implemented in the feature controller 112. The feature controller module 220 may select one or more features from the plurality of spatial features using a second machine learning model. The second machine learning model may be trained to select the one or more features from the plurality of spatial features based on a probability of accuracy of each of the plurality of spatial features based on the second training data. The second training data that may include historical document data and their corresponding layouts based on which data corresponding to one or more keywords and entities may have been extracted by determining one or more of the spatial features. In an embodiment, the second machine learning model may be selected as, but not limited to, classification models such as, logistic regression, decision trees, random forest, XGBoost, etc. As explained before, the plurality of spatial features may include a plurality of text features, a plurality of layout features, and a plurality of location features. It is to be noted that the plurality of text features may include numeric features, percentage features, positioning features, pattern features, etc. Further, the plurality of location features may include co-ordinate location information and angle information of each of the keywords and entity corresponding to each other, etc. In an embodiment, the angle information may be determined as an angle of spatial connection between an entity and a keyword in a clockwise direction or an anti-clockwise direction. Further, the plurality of layout features may include, but not limited to, determination of a layout of a document based on determination of keyword-to-keyword connections.

Referring to FIG. 2, the ML extraction module 222 may be implemented on ML extractor 114. The ML extraction module 222 may extract in each of the set of documents, data of the set of entities corresponding to the set of keywords based on the selection of the one or more features and the similarity between the layouts of at least two of the set of documents using a third machine learning model. The third machine learning model may be trained to determine a feature-based probability for the extraction of the data of the set of entities corresponding to each of the set of keywords based on the third training data. In an embodiment, the third training data may include historical document data and their layouts, and one or more types of spatial features extracted from each of the historical document data. In an embodiment, the third machine learning model may be selected as, but not limited to, classification models such as, logistic regression, decision trees, random forest, XGBoost, etc.

Figure 7:
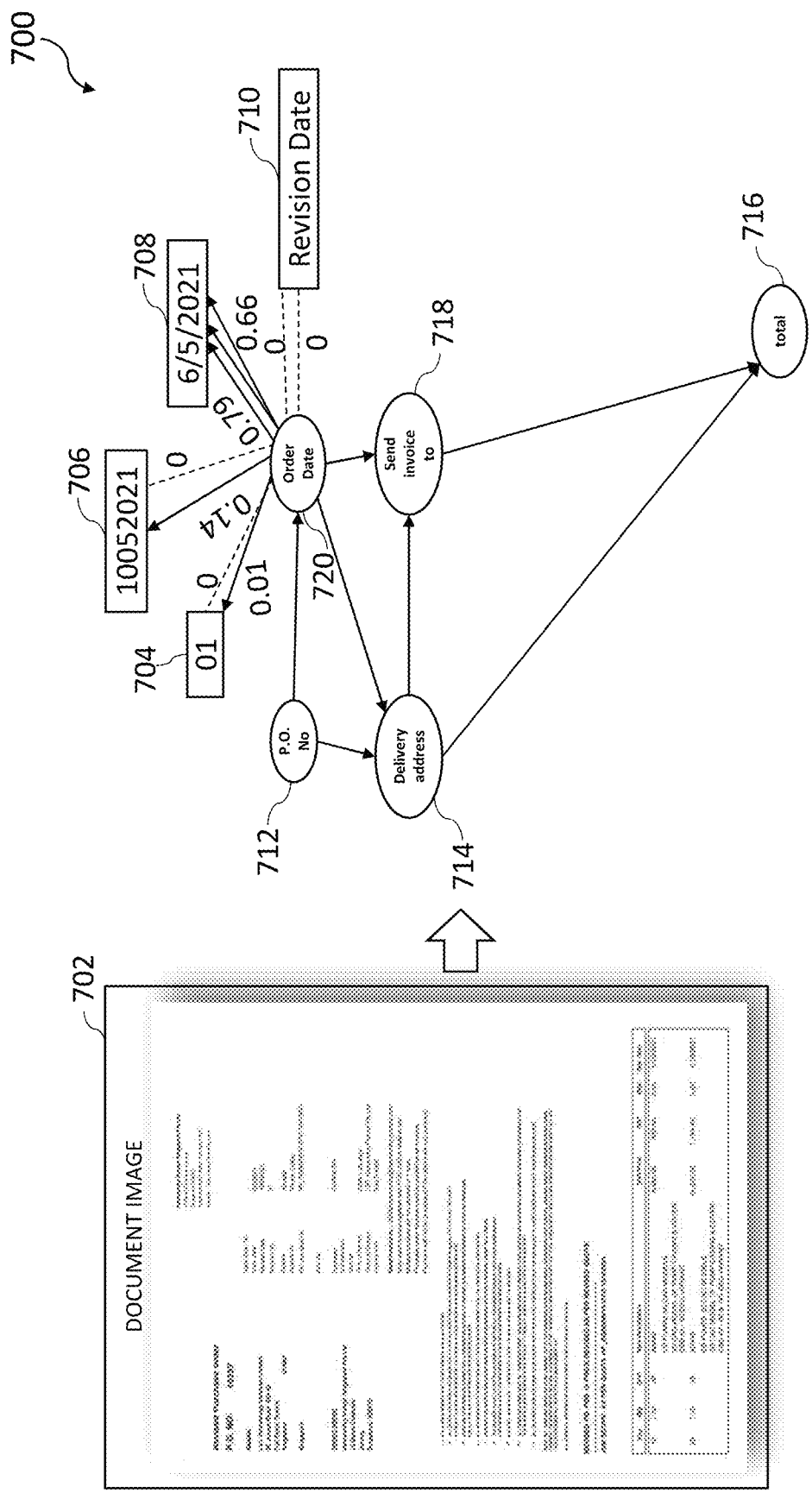
FIG. 7 illustrates exemplary extraction of data from an exemplary document image 702, in accordance with an embodiment of the present disclosure.

Referring now to FIG. 7, exemplary extraction of data from an exemplary document image 702 is illustrated, in accordance with an embodiment of the present disclosure. In an embodiment, 700 depicts a layout of the exemplary input document image 702. The layout 700 depicts keywords 712, 714, 716, 718 and 720. In an embodiment, the ML extraction module 222 may detect various entities 704, 706, 708, 710 to extract data corresponding to the keyword 720. The ML extraction module 222 may select an entity from the entities 704, 706, 708, 710 having the highest feature-based probability for extraction. As shown in FIG. 7, entity 708 is shown to have highest feature-based probability amongst the entities 704, 706, 708, 710 corresponding to the keyword 720. Accordingly, the keyword 720 and the entity 708 pair may be extracted by the ML extraction module 222. Similarly, the ML extraction module 222 may extract data corresponding to each of the keywords 712, 714, 716 and 718 by determining an entity with highest feature-based probability for each of the keywords 712, 714, 716 and 718.

Figure 8:
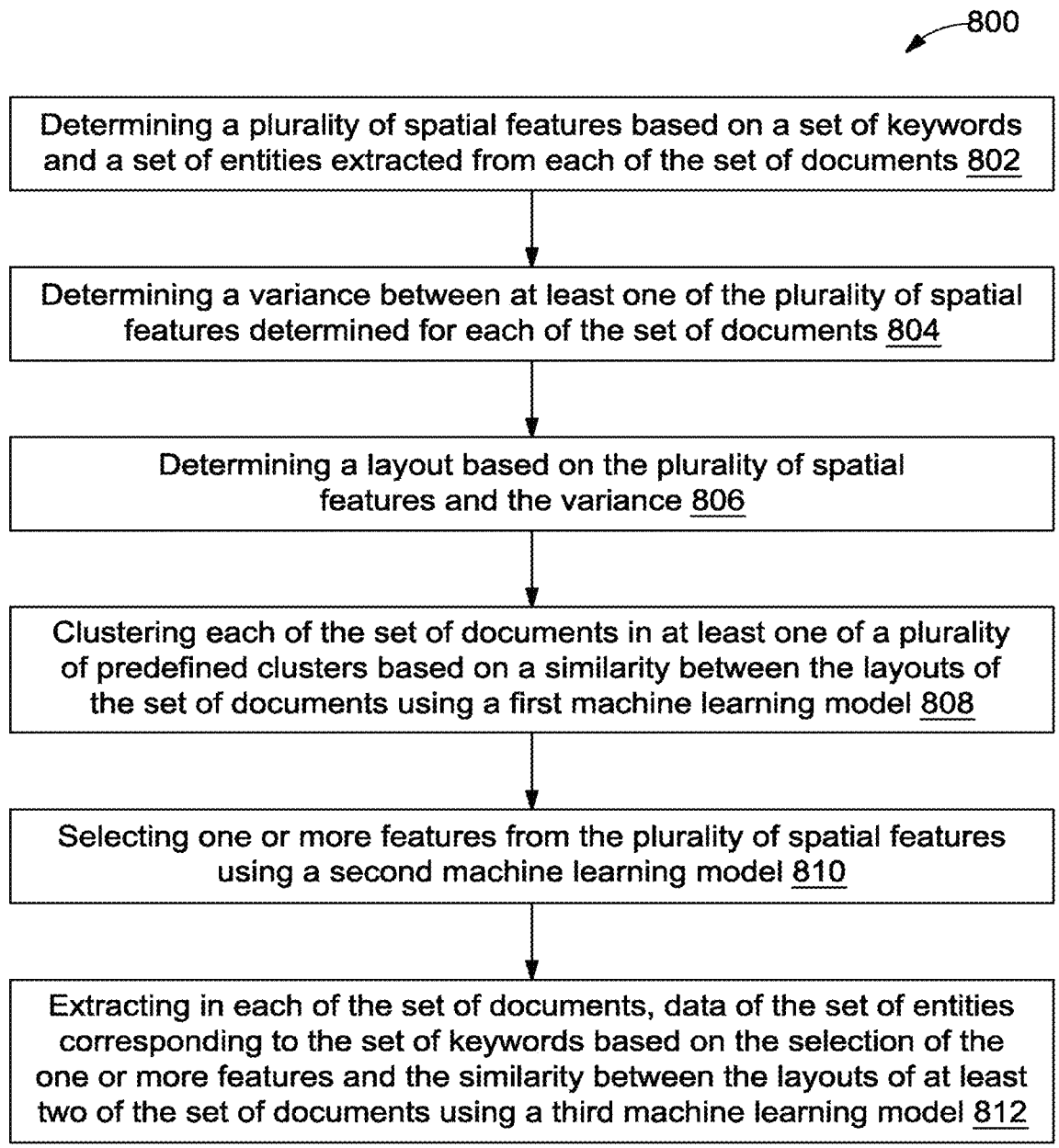
FIG. 8 is a flowchart of a method for extracting data based on spatial features, in accordance with some embodiments of the present disclosure.

Referring now to FIG. 8, a flowchart of a method for extracting data based on spatial features is depicted, in accordance with some embodiments of the present disclosure. In an embodiment, method 800 may include a plurality of steps that may be performed by the processor 104 to extract data based on spatial features.

At step 802, a plurality of spatial features may be determined based on a set of keywords and a set of entities extracted from each of the set of documents. In an embodiment, the plurality of spatial features may include a plurality of text features, a plurality of layout features, and a plurality of location features.

Further at step 804, a variance between at least one of the plurality of spatial features may be determined for each of the set of documents.

Further at step 806, a layout may be determined based on the plurality of spatial features and the variance.

Further at step 808, each of the set of documents may be clustered in at least one of a plurality of predefined clusters based on a similarity between the layouts of the set of documents using a first machine learning model. In an embodiment, the each of the plurality of predefined clusters may correspond to a unique document layout from a plurality of document layouts. Further, the first machine learning model may be trained based on a first training data comprising a plurality of documents corresponding to the plurality of document layouts. Furthermore, the similarity between the layouts of at least two of the set of documents may be determined by selecting one or more spatial connections between the set of keywords and an entity in each of the at least two documents based on the variance.

Further at step 810, one or more features from the plurality of spatial features may be selected using a second machine learning model. In an embodiment, the second machine learning model may be trained to select the one or more from the plurality of spatial features based on a probability of accuracy of each of the plurality of spatial features based on a second training data.

Further at step 812, for each of the set of documents, data of the set of entities corresponding to the set of keywords may be extracted based on the selection of the one or more features and the similarity between the layouts of at least two of the set of documents using a third machine learning model. In an embodiment, the third machine learning model may be trained to determine a feature-based probability for the extraction of the data of the set of entities corresponding to the set of keywords based on a third training data.

It is intended that the disclosure and examples be considered as exemplary only, with a true scope of disclosed embodiments being indicated by the following claims.

What is claimed is:

1. A method of extracting data from a set of documents, the method comprising:
   for each document of the set of documents stored in a database:
   determining, by a processor, a plurality of spatial features based on a set of keywords and a set of entities extracted from each document of the set of documents, wherein the plurality of spatial features comprises a plurality of text features, a plurality of layout features, and a plurality of location features;

determining, by the processor, a variance between at least one spatial feature of the plurality of spatial features determined for each document of the set of documents;

determining, by the processor, a layout based on the plurality of spatial features and the variance;

clustering, by the processor, each document of the set of documents in at least one predefined cluster of a plurality of predefined clusters based on a similarity between the layouts of the set of documents using a first machine learning model executed on a computing device, wherein each document from the plurality of predefined clusters correspond to a unique document layout from a plurality of document layouts, wherein the first machine learning model is trained based on first training data comprising a plurality of documents corresponding to the plurality of document layouts, and wherein the similarity between layouts of at least two documents of the set of documents is determined by selecting one or more spatial connections between the set of keywords and an entity in each document of the at least two documents based on the variance;

selecting, by the processor, one or more spatial features from the plurality of spatial features using a second machine learning model that is different from the first machine learning model, wherein the second machine learning model is trained to select the one or more spatial features from the plurality of spatial features based on a probability of accuracy of each spatial feature of the plurality of spatial features based on second training data; and extracting, by the processor, in each document of the set of documents, data of the set of entities corresponding to the set of keywords based on the selection of the one or more spatial features and the similarity between the layouts of at least two documents of the set of documents using a third machine learning model, wherein the third machine learning model is trained to determine a feature-based probability for the extraction of the data of the set of entities corresponding to the set of keywords based on third training data.

2. The method of claim 1, wherein the determination of variance between at least one spatial feature of the plurality of spatial features determined for each document of the set of documents comprises: determining, by the processor, a spatial information for each entity of the set of entities and each keyword of the set of keywords of each document of the set of documents, wherein the spatial information comprises coordinate distance between the each entity of the set of entities and each keyword of the set of keywords of each document of the set of documents.

3. The method of claim 2, wherein the determination of the layout, for each document of the set of documents, comprises: determining, by the processor, the one or more spatial connections between each keyword of the set of keywords and each entity of the set of entities in a sequential manner.

4. The method of claim 3, comprises:
selecting, by the processor, a predefined number of the one or more spatial connections in the at least two documents in case the variance, between the spatial information and between the set of keywords and the entity in each document of the at least two documents, is greater than a predefined variance threshold.

5. The method of claim 1, wherein the set of keywords, in each document of the set of documents, are determined based on a keyword lookup table, wherein the keywork lookup table comprises a predefined list of keywords and at least one alias corresponding to each keyword of the predefined list of keywords.

6. The method of claim 1, wherein the set of entities, in each document of the set of documents, are determined based on detection of one or more of numeric characters, one or more of alphabetic characters, and/or a combination of numeric characters, and/or alphanumeric characters other than the set of keywords.

7. A system of extracting data from a set of documents, comprising:
a processor; and
a memory communicably coupled to the processor, wherein the memory stores processor-executable instructions, which, on executing by the processor, cause the processor to:
for each document of the set of documents stored in a database:
determine a plurality of spatial features based on a set of keywords and a set of entities extracted from each document of the set of documents, wherein the plurality of spatial features comprises a plurality of text features, a plurality of layout features, and a plurality of location features;
determine a variance between at least one spatial feature of the plurality of spatial features determined for each document of the set of documents;
determine a layout based on the plurality of spatial features and the variance;
cluster each document of the set of documents in at least one predefined cluster of a plurality of predefined clusters based on a similarity between the layouts of the set of documents using a first machine learning model executed on a computing device, wherein each document from the plurality of predefined clusters correspond to a unique document layout from a plurality of document layouts, wherein the first machine learning model is trained based on first training data comprising a plurality of documents corresponding to the plurality of document layouts, and wherein the similarity between layouts of at least two documents of the set of documents is determined by selecting one or more spatial connections between the set of keywords and an entity in each document of the at least two documents based on the variance;
select one or more spatial features from the plurality of spatial features using a second machine learning model that is different from the first machine learning model, wherein the second machine learning model is trained to select the one or more spatial features from the plurality of spatial features based on a probability of accuracy of each spatial feature of the plurality of spatial features based on second training data; and
extract in each document of the set of documents, data of the set of entities corresponding to the set of keywords based on the selection of the one or more spatial features and the similarity between the layouts of at least two documents of the set of documents using a third machine learning model, wherein the third machine learning model is trained to determine a feature-based probability for the extraction of the data of the set of entities corresponding to the set of keywords based on third training data.

8. The system of claim 7, wherein the determination of variance between at least one spatial feature of the plurality of spatial features determined for each document of the set of documents is based on a determination of a spatial information for each entity of the set of entities and each keyword of the set of keywords of each document of the set of documents, wherein the spatial information comprises coordinate distance between the each entity of the set of entities and each keyword of the set of keywords of each document of the set of documents.

9. The system of claim 8, wherein the determination of the layout, for each document of the set of documents, is based on a determination of the one or more spatial connections between each keyword of the set of keywords and each entity of the set of entities in a sequential manner.

10. The system of claim 9, wherein the processor is configured to:
select a predefined number of the one or more spatial connections in the at least two documents in case the variance, between the spatial information and between the set of keywords and the entity in each document of the at least two documents, is greater than a predefined variance threshold.

11. The system of claim 7, wherein the set of keywords, in each document of the set of documents, are determined based on a keyword lookup table, wherein the keyword lookup table comprises a predefined list of keywords and at least one alias corresponding to each keyword of the predefined list of keywords.

12. The system of claim 7, wherein the set of entities, in each document of the set of documents, are determined based on detection of one or more of numeric characters, one or more of alphabetic characters, and/or a combination of numeric characters, and/or alphanumeric characters other than the set of keywords.

13. A non-transitory computer-readable medium storing computer-executable instructions for extracting data from a set of documents, the computer-executable instructions configured for:
for each document of the set of documents stored in a database:
determining a plurality of spatial features based on a set of keywords and a set of entities extracted from each document of the set of documents, wherein the plurality of spatial features comprises a plurality of text features, a plurality of layout features, and a plurality of location features;
determining a variance between at least one spatial feature of the plurality of spatial features determined for each document of the set of documents;
determining a layout based on the plurality of spatial features and the variance;
clustering each document of the set of documents in at least one predefined cluster of a plurality of predefined clusters based on a similarity between the layouts of the set of documents using a first machine learning model executed on a computing device, wherein each document from the plurality of predefined clusters correspond to a unique document layout from a plurality of document layouts, wherein the first machine learning model is trained based on first training data comprising a plurality of documents corresponding to the plurality of document layouts, and wherein the similarity between layouts of at least two documents of the set of documents is determined by selecting one or more spatial connections between the set of keywords and an entity in each document of the at least two documents based on the variance;
selecting one or more spatial features from the plurality of spatial features using a second machine learning model that is different from the first machine learning model, wherein the second machine learning model is trained to select the one or more spatial features from the plurality of spatial features based on a probability of accuracy of each spatial feature of the plurality of spatial features based on second training data; and
extracting in each document of the set of documents, data of the set of entities corresponding to the set of keywords based on the selection of the one or more spatial features and the similarity between the layouts of at least two documents of the set of documents using a third machine learning model, wherein the third machine learning model is trained to determine a feature-based probability for the extraction of the data of the set of entities corresponding to the set of keywords based on third training data.

14. The non-transitory computer-readable medium of claim 13, wherein the computer-executable instructions are configured to determine variance between at least one spatial feature of the plurality of spatial features determined for each document of the set of documents by: determining a spatial information for each entity of the set of entities and each keyword of the set of keywords of each document of the set of documents, wherein the spatial information comprises coordinate distance between the each entity of the set of entities and each keyword of the set of keywords of each document of the set of documents.

15. The non-transitory computer-readable medium of claim 14, wherein the computer-executable instructions are configured to determine the layout, for each document of the set of documents, by: determining the one or more spatial connections between each keyword of the set of keywords and each entity of the set of entities in a sequential manner.

16. The non-transitory computer-readable medium of claim 15, the computer-executable instructions are configured to: select a predefined number of the one or more spatial connections in the at least two documents in case the variance, between the spatial information and between the set of keywords and the entity in each document of the at least two documents, is greater than a predefined variance threshold.

17. The non-transitory computer-readable medium of claim 13, wherein the set of keywords, in each document of the set of documents, are determined based on a keyword lookup table, wherein the keywork lookup table comprises a predefined list of keywords and at least one alias corresponding to each keyword of the predefined list of keywords.

18. The non-transitory computer-readable medium of claim 13, wherein the set of entities, in each document of the set of documents, are determined based on detection of one or more of numeric characters, one or more of alphabetic characters, and/or a combination of numeric characters, and/or alphanumeric characters other than the set of keywords.

* * * * *